(12) United States Patent
Charng et al.

(10) Patent No.: US 9,804,680 B2
(45) Date of Patent: Oct. 31, 2017

(54) COMPUTING DEVICE AND METHOD FOR GENERATING GESTURES

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Jen-Hsiung Charng, New Taipei (TW); Ming-Chuan Kao, New Taipei (TW); Shih-Hung Chiou, New Taipei (TW); Chih-Yu Chen, New Taipei (TW); Hsiung-Yi Yang, New Taipei (TW)

(73) Assignees: HONG FU JIN PRECISION INDUSTRY (ShenZhen) CO., LTD., Shenzhen (CN); HON HAI PRECISION INDUSTRY CO.,. LTD., New Taipei (TW)

( * ) Notice: Subject to any disclaimer, the term of this patent is extended or adjusted under 35 U.S.C. 154(b) by 77 days.

(21) Appl. No.: 14/927,474

(22) Filed: Oct. 30, 2015

(65) Prior Publication Data
US 2016/0132125 A1 May 12, 2016

(30) Foreign Application Priority Data
Nov. 7, 2014 (TW) .............................. 103138844 A (51) Int. Cl.
*G09G 5/00* (2006.01)
*G06F 3/01* (2006.01)
(Continued)

(52) U.S. Cl.
CPC ............ *G06F 3/017* (2013.01); *G06F 3/0304* (2013.01); *G06K 9/00355* (2013.01); *G06K 9/4604* (2013.01); *G06K 9/52* (2013.01)

(58) Field of Classification Search
CPC ...... G06F 3/017; G06F 3/0304; G06F 1/1694; G06K 9/4604; G06K 9/52; G06K 9/00355; G10H 2220/455
(Continued)

(56) References Cited

U.S. PATENT DOCUMENTS 5,704,836 A * 1/1998 Norton .................... A63F 13/06
250/221
6,031,934 A * 2/2000 Ahmad ..................... G06T 7/66
382/154
(Continued)

FOREIGN PATENT DOCUMENTS

CN 101379455 A 3/2009
CN 102298443 B 9/2013
(Continued)

*Primary Examiner* — Rodney Amadiz
(74) *Attorney, Agent, or Firm* — Steven Reiss (57) ABSTRACT

Precise analysis and description of movement and gestures by a human or other object are carried out by a computing device assisted by camera and distance sensors. The same gestures and movements of an object in different locations and in different orientations may be identified according to coordinates and offsets applied to coordinates, and gesture-making areas projected so as to surround the object. The techniques can accurately identify actions of movements of the human or other object.

12 Claims, 9 Drawing Sheets

(51) Int. Cl.
*G06K 9/00* (2006.01)
*G06K 9/52* (2006.01)
*G06K 9/46* (2006.01)
*G06F 3/03* (2006.01)

(58) Field of Classification Search
USPC .................................. 345/156–158; 715/863
See application file for complete search history.

(56) References Cited

U.S. PATENT DOCUMENTS

| | | | | |
|---|---|---|---|---|
| 6,130,677 | A * | 10/2000 | Kunz | G06T 13/80 |
| | | | | 345/630 |
| 8,963,829 | B2 * | 2/2015 | Lee | G06F 3/017 |
| | | | | 345/156 |
| 9,659,377 | B2 * | 5/2017 | Lee | G06T 7/246 |
| 2009/0027337 | A1 * | 1/2009 | Hildreth | G06F 3/011 |
| | | | | 345/158 |
| 2012/0056982 | A1 | 3/2012 | Katz et al. | |

FOREIGN PATENT DOCUMENTS

| | | |
|---|---|---|
| TW | I293423 | 2/2008 |
| TW | 201019906 A1 | 6/2010 |
| TW | 201234284 A | 8/2012 |

\* cited by examiner

COMPUTING DEVICE AND METHOD FOR GENERATING GESTURES

FIELD

The subject matter herein generally relates to communication technology.

BACKGROUND

Users can be provided with somatosensory equipment which is activated by user's gestures and one or more applications can be carried out according to the gestures which cause activation. But the equipment cannot provide accurate identification or determination for the gestures causing activation. For example, it cannot determine whether a gesture has touched a designated area.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

It should be noted that references to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series and the like.

Figure 1:
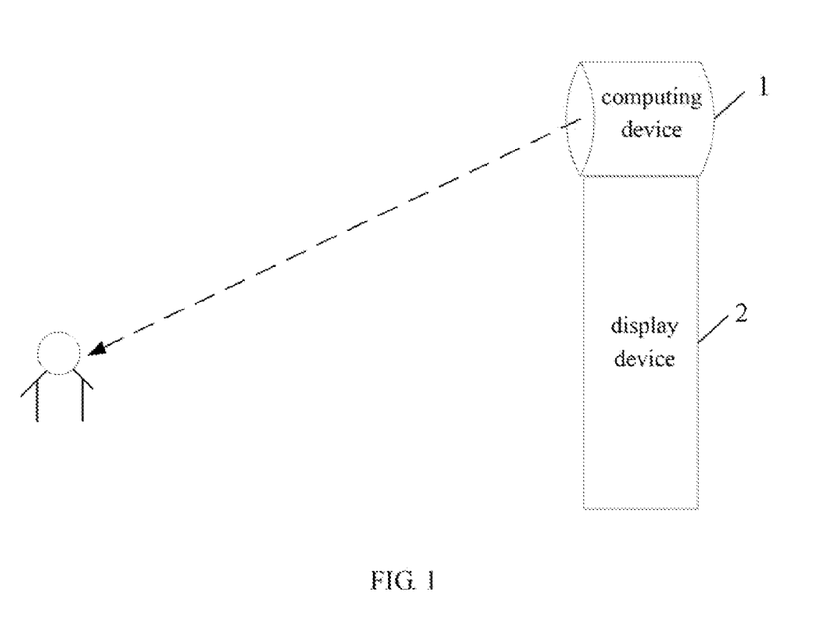
FIG. 1 is a diagrammatic view of an operating environment of one embodiment of a computing device.
Figure 2:
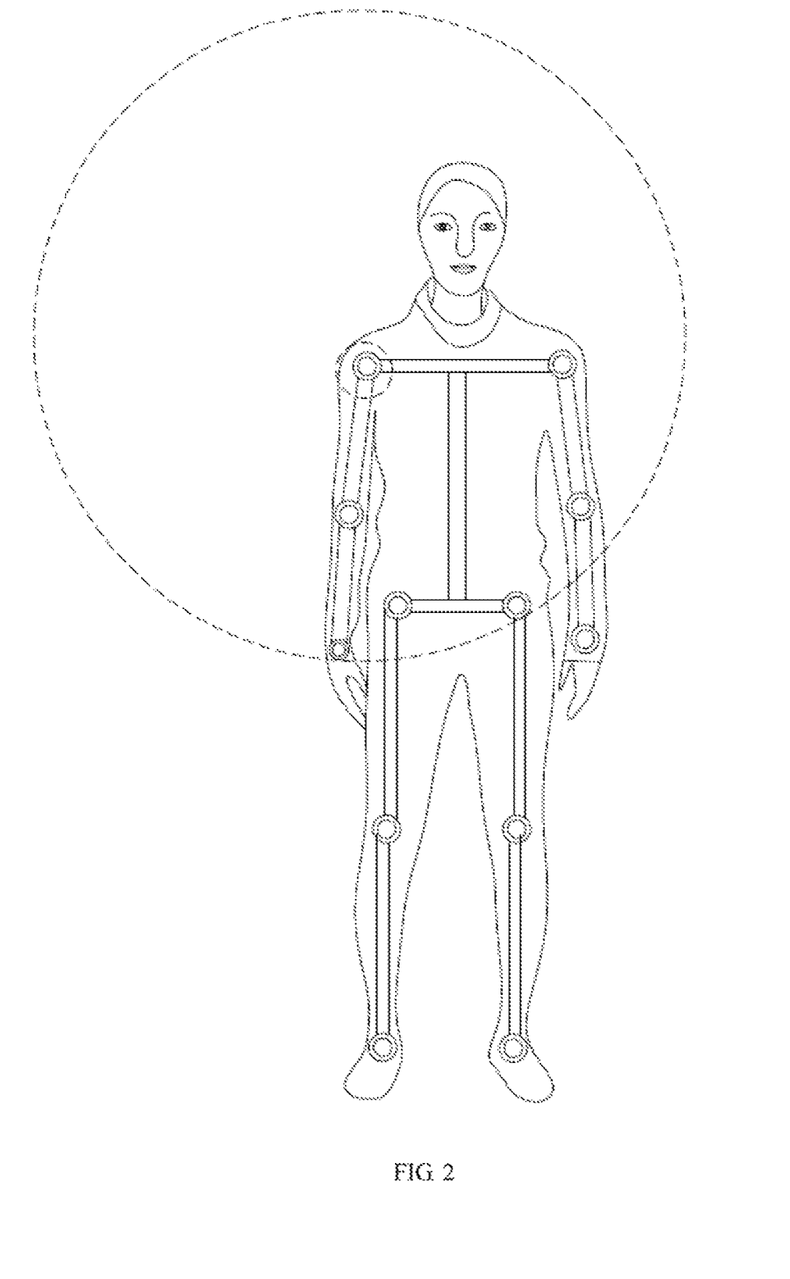
FIG. 2 is a diagrammatic view of coordinates of an object.
Figure 3:
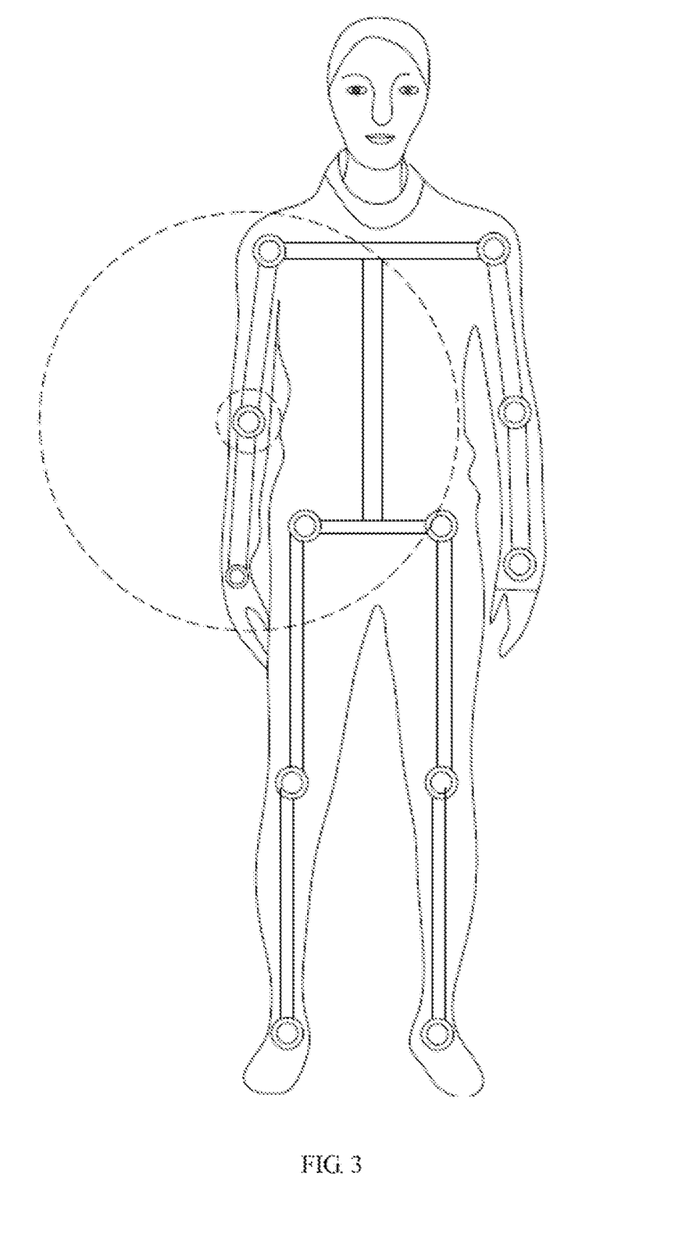
FIG. 3 is a diagrammatic view of coordinates of an object in another embodiment.

FIG. 1 is a diagrammatic view of an operating environment of one embodiment of a computing device 1. The computing device 1 (e.g. somatosensory equipment) senses one or more objects (in front of the computing device 1) and obtains coordinates of the objects. In the illustrated embodiment, the objects may be, for example, one or more human beings. The coordinates of the objects may be, for example, coordinates of the one or more humans. The coordinates may include, for example, a head coordinate, a left shoulder coordinate, a right shoulder coordinate, a left elbow coordinate, a right elbow coordinate, a left wrist coordinate, a right wrist coordinate, a left leg joint coordinate, and a right leg joint coordinate. FIG. 2 illustrates the computing device 1 obtaining the right shoulder coordinates. FIG. 3 illustrates the computing device 1 obtaining the right elbow coordinates. The computing device 1 may include one or more cameras utilized to capture images of objects located in front of the computing device 1.

The computing device 1, which is configured to view and analyze gestures (or actions) of an object in front of it, includes one or more applications which may be carried out (e.g. startup, shutdown) according to the viewed gestures. The applications may be for example, but not be limited to, games, players, browsers, and chat software.

A display device 2 is configured to display one or more graphical object interfaces (GUI) of the applications of the computing device 1 and/or images of the objects which are captured by the computing device 1.

The computing device 1 may be an internal device built into the display device 2, or an independent device connecting to the display device 2 with cable or wireless communication. In the illustrated embodiment, the computing device 1 is installed on one side of the display device 2 (e.g. a middle point of a top edge of the display device 2).

Figure 4:
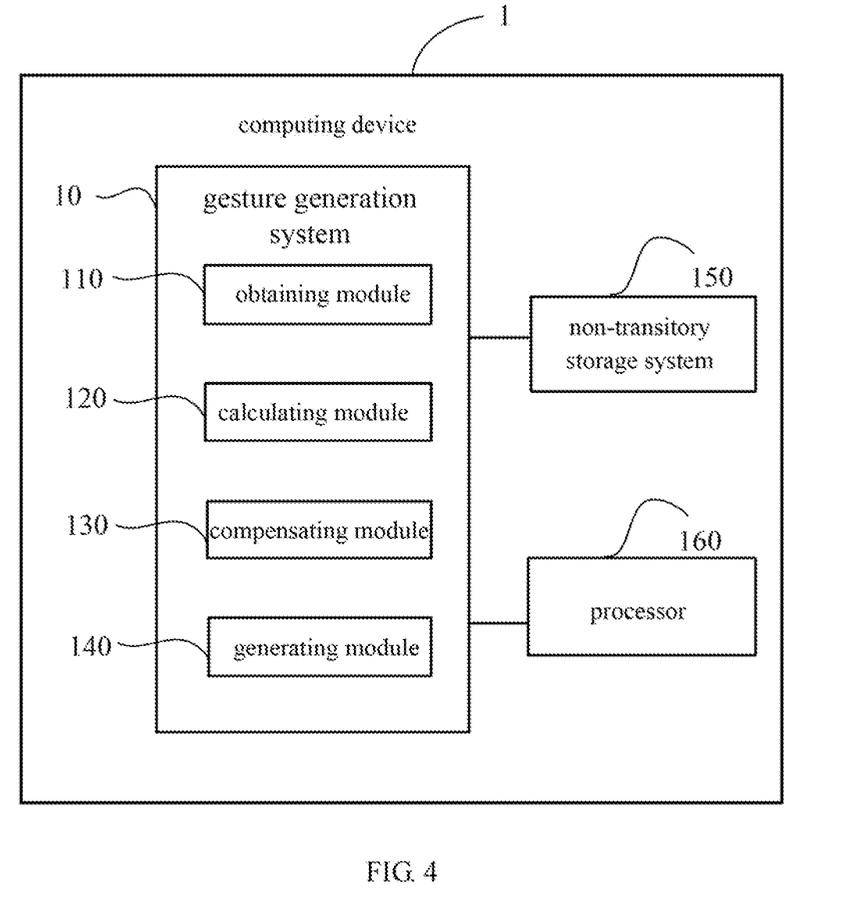
FIG. 4 is a block diagram of one embodiment of a computing device.

FIG. 4 is a block diagram of one embodiment of a computing device. The computing device 1 comprises a non-transitory storage system 150, a processor 160, and a gesture generation system 10. The gesture generation system 10 comprises an obtaining module 110, a calculating module 120, a compensating module 130, and a generating module 140. The modules 110-140 are stored in the non-transitory storage system 150 and their functions are executed by the processor 160.

The obtaining module 110 obtains coordinates of an object. The obtaining module 110 may, for example, obtain the coordinates of the object by one or more distance sensors in the computing device 1, or by analyzing images captured by the computing device 1, to obtain the coordinates of the object.

The calculating module 120 calculates a gesture-making area and a coordinate of a center point of the gesture-making area according to the coordinates of the object. The coordinate of the center point of the gesture-making area includes a coordinate of a center point of the left gesture-making area and a coordinate of a center point of the right gesture-making area. The gesture-making area comprises a left gesture-making area and a right gesture-making area.

The calculation of the coordinate of the center point of the left gesture-making area includes: $C(x, y, z)=P(x, y, z)+d(x, y, z)$, wherein the $C(x, y, z)$ is the coordinate of the center point of the left gesture-making area, the $P(x, y, z)$ is the left shoulder coordinate, the $d(x, y, z)$ is an arbitrary coordinate that is configured to $|d(x, y, z)|<D1$, and the D1 is a maximum distance between the left shoulder coordinate and the head coordinate. A distance between a left side of the left gesture-making area and the center point of the left gesture-making area is S, $S=k*D2$, the k is a real number, and the D2 is a distance between the left elbow coordinate and the left wrist coordinate. In the illustrated embodiment, the k is a predetermined value within the range of (0.1-3).

The left side of gesture-making area, which distances the S from the coordinate of the center point of the left gesture-making area, is generated when the $C(x, y, z)$ serves as the coordinate of the center point of the left gesture-making area.

Figure 5:
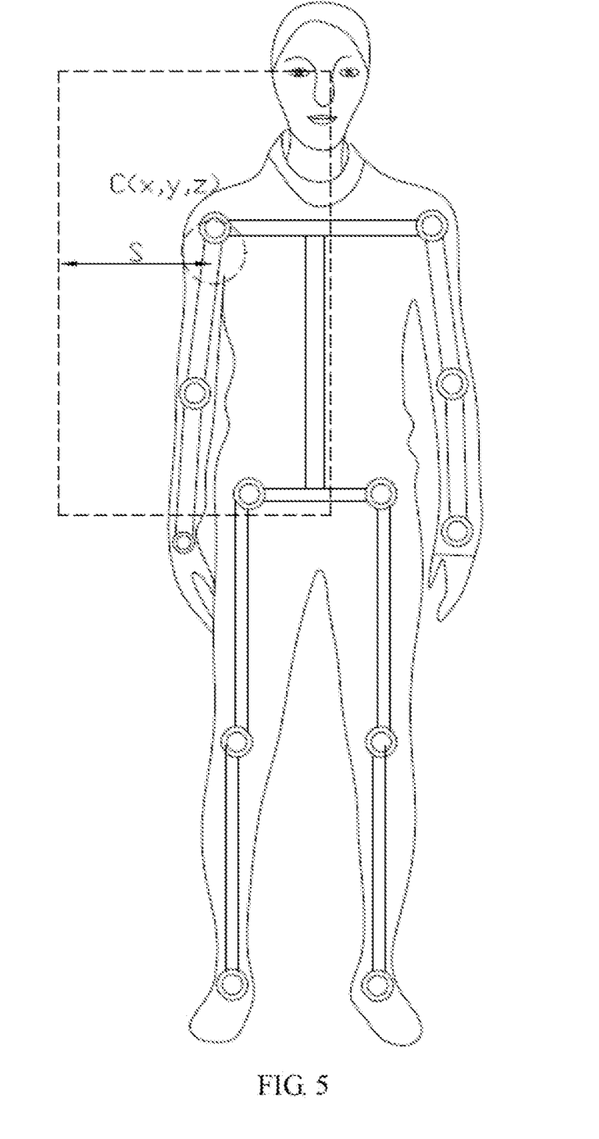
FIG. 5 is a diagrammatic view of one embodiment for obtaining coordinates of a center point of a gesture-making area.
Figure 6:
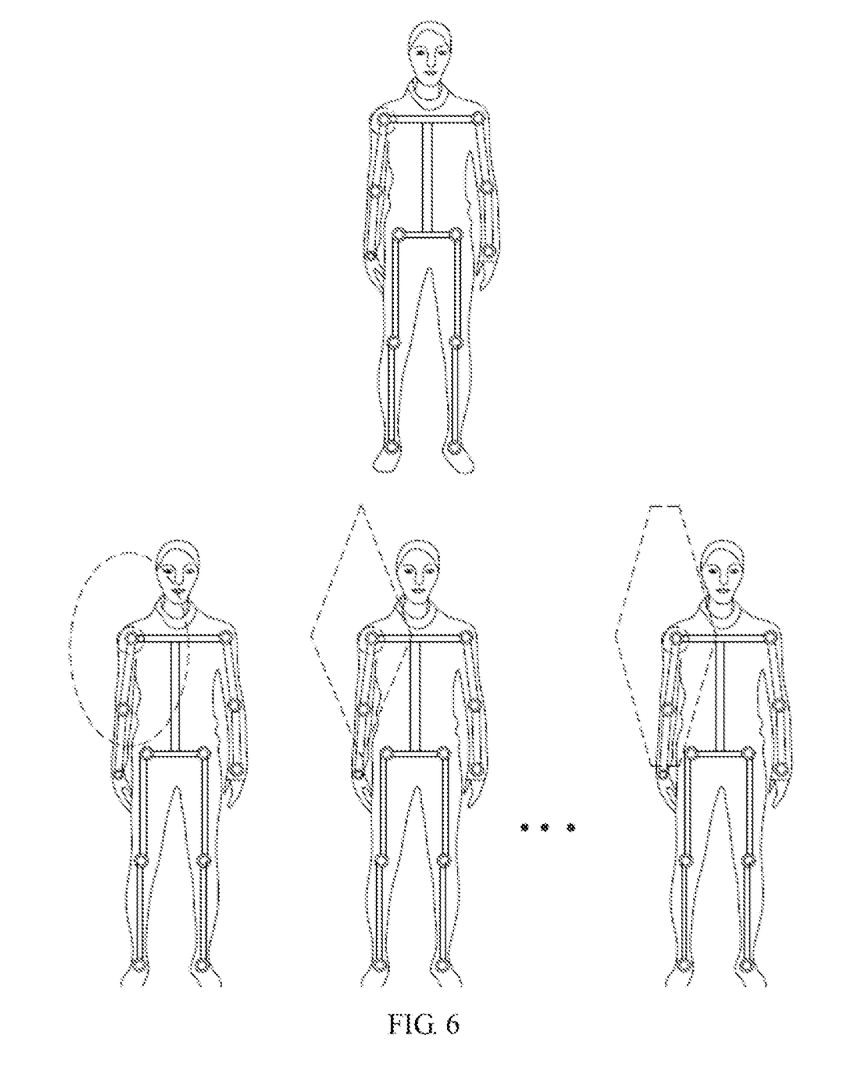
FIG. 6 is a diagrammatic view of one embodiment of other gesture-making areas.

The calculation of the coordinate of the center point of the right gesture-making area includes: $C1(x, y, z)=P1(x, y, z)+d1(x, y, z)$, wherein the $C1(x, y, z)$ is the coordinate of the center point of the right gesture-making area, the $P1(x, y, z)$ is the right shoulder coordinate, the $d1(x, y, z)$ is an arbitrary coordinate that is configured to $|d1(x, y, z)|<D11$, and the D11 is a maximum distance between the right shoulder coordinate and the head coordinate. A distance between a left side of the right gesture-making area and the center point of the right gesture-making area is S1, $S1=k1*D12$, the k1 is a real number, and the D12 is a distance between the right elbow coordinate and the right wrist coordinate. In the illustrated embodiment, the k1 is a predetermined value within the range of (0.1-3). In the same way as described above, the right side of gesture-making area, which distances the S1 from the coordinate of the center point of the right gesture-making area, is generated when the $C1(x, y, z)$ serves as the coordinate of the center point of the left gesture-making area (referring to FIG. 5). As illustrated in FIG. 5, a shape of the right gesture-making area is a rectangle. The disclosure is not limited thereto, the right gesture-making area may be, for example, an area of three-dimensional-space. The shape of the right gesture-making area may be, for example, an oval, a diamond, a hexagon, and others. The distances S1, between the coordinate of the center point of the right gesture-making area and a plurality of edges (e.g. front, behind, top or bottom edge) of the gesture-making area, are all different. According to orientations of different objects, an adapted area is configured by adjusting S1 (referring to FIG. 6).

Figure 7:
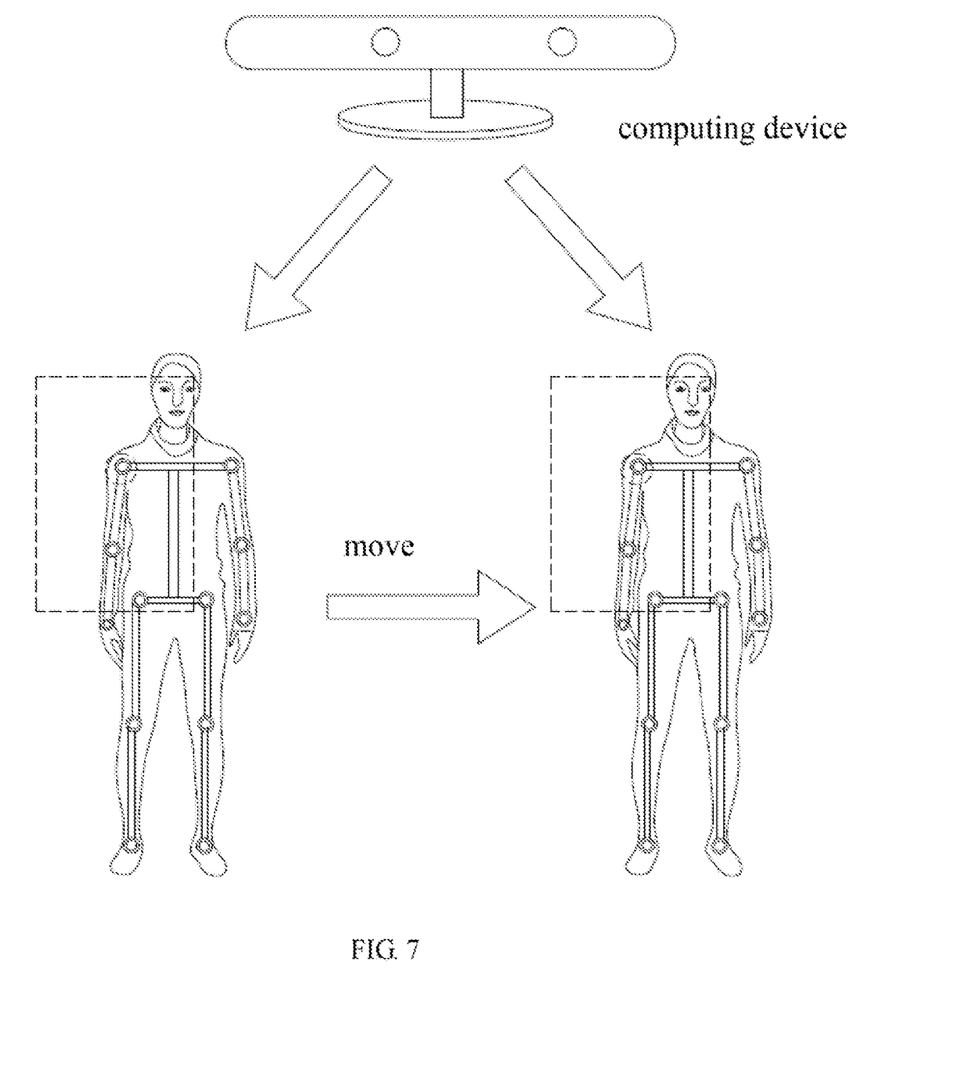
FIG. 7 is a diagrammatic view of one embodiment of a gesture-making area when a object is moving.

According to the formula $C1(x, y, z)=P1(x, y, z)+d1(x, y, z)$, the right shoulder coordinate $P1(x, y, z)$ changes when the object moves/is moved, so the $C1(x, y, z)$ changes with the movement, and the right gesture-making area also moves accordingly, the disclosure is not limited to one position. Referring to FIG. 7, the right gesture-making area moves to right hand side when the object is moved to the right. Similarly, the left gesture-making area also moves with the object.

The compensating module 130 calculates offset coordinates, and compensates the coordinate of the center point of the gesture-making area according to the calculated offset coordinates, to correct the gesture-making area.

The offset coordinate includes a left offset coordinate and a right offset coordinate.

The calculation of the left offset coordinate includes the left offset coordinate being $I(x, y, z)$, wherein the left offset coordinate is obtained after training based on machine learning algorithms. The machine learning algorithms can be decision tree algorithms.

Figure 8:
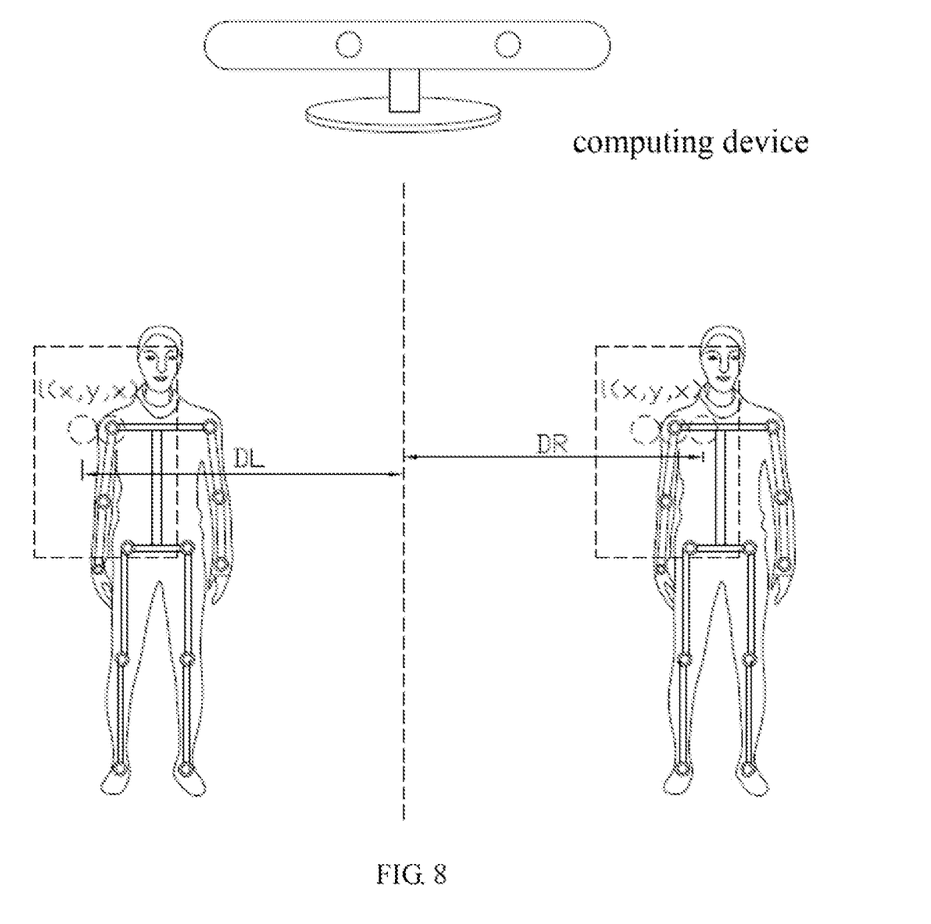
FIG. 8 is a diagrammatic view of one embodiment for calculating offset coordinates.

An example of calculating an x-axis coordinate value of the left offset coordinates is given. Referring to FIG. 8, an actual x-axis distance DL between the object and the computing device is measured by a tool (e.g. a ruler) when the object is located in a position (e.g. a left position in front of the computing device 1). A test x-axis distance between the center point of the left gesture-making area and the computing device is calculated by the computing device 1 and a difference value between the actual distance and the test value is obtained. In the same way as described above, a plurality of different values may be obtained, which correspond to a plurality of positions of the object. An average value of the plurality of difference values is calculated, the average value being the x-axis coordinate value of the left offset coordinates. Similarly, a y-axis coordinate value of the left offset coordinates and a z-axis coordinate value of the left offset coordinates also can be obtained.

The compensation applied to the coordinate of the center point of the left gesture-making area is: $C\char`\^(x, y, z)=C(x, y, z)+1(x, y, z)$, wherein the $C\char`\^(x, y, z)$ is the compensated coordinate of the center point of the right gesture-making area.

The calculation of the left offset coordinate includes the right offset coordinate being $I1(x, y, z)$, wherein the right offset coordinate is obtained after training based on machine learning algorithms. The machine learning algorithms can be decision tree algorithms.

An example of calculating an x-axis coordinate value of the right offset coordinates is given. Referring to FIG. 8, an actual x-axis distance DR between the object and the computing device is measured by a tool (e.g. a ruler) when the object is located in a position (e.g. a right position in front of the computing device 1). A test x-axis distance between the center point of the right gesture-making area and the computing device is calculated by the computing device 1 and a difference value between the actual distance and the test value is obtained. In the same way as described above, a plurality of different values may be obtained, which correspond to a plurality of positions of the object. An average value of the plurality of difference values is calculated, the average value being the x-axis coordinate value of the right offset coordinates. A y-axis coordinate value of the right offset coordinates and a z-axis coordinate value of the right offset coordinates also can be obtained.

The compensation applied to the coordinate of the center point of the right gesture-making area is: $C1\char`\^(x, y, z)=C1(x, y, z)+11(x, y, z)$, wherein the $C1\char`\^(x, y, z)$ is the compensated coordinate of the center point of the right gesture-making area.

The generating module 140 analyzes and describes a gesture (e.g. an upward gesture, an upward gesture, a downward gesture, a leftward gesture, a rightward gesture) according to the offset coordinates and the corrected gesture-making area, and accordingly generates a gesture event. In the illustrated embodiment, the wrist coordinates include a left wrist coordinate and a right wrist coordinate. The left wrist coordinate is adjusted by reference to an offset coordinate of the left wrist (in other words, the left wrist coordinate is obtained by adding the left wrist coordinate and the offset coordinate of the left wrist), and the right wrist coordinate is adjusted by reference to an offset coordinate of the right wrist (namely, the right wrist coordinate is obtained by adding the right wrist coordinate and the offset coordinate of the right wrist).

The analyzing and description of the gesture comprises the following parameters; where the x-axis is a horizontal axis, left side of the axis is positive side of the axis, and right is negative; where the y-axis is a vertical axis, up is positive, down is negative. Where the z-axis is a depth axis, front is positive, behind is negative. When the gesture-making area is the left side of the gesture-making area, the generating module 140.

The generating module 140 generates an upward gesture event when the y-axis coordinate value of the left wrist coordinate is greater than the y-axis coordinate value of a top edge of the left gesture-making area (an upward gesture is analyzed and described according to the above description in this paragraph).

The generating module 140 generates a downward gesture event when the y-axis coordinate value of the left wrist coordinate is less than the y-axis coordinate value of a bottom edge of the left gesture-making area (a downward gesture is analyzed and described).

The generating module 140 generates a leftward gesture event when the x-axis coordinate value of the left wrist coordinate is greater than the x-axis coordinate value of a left edge of the left gesture-making area (an leftward gesture is analyzed and described);

The generating module 140 generates a rightward gesture event when the x-axis coordinate value of the left wrist coordinate is less than the x-axis coordinate value of a right edge of the left gesture-making area (an rightward gesture is analyzed and described).

The generating module 140 generates a forward gesture event when the z-axis coordinate value of the left wrist coordinate is greater than the z-axis coordinate value of a front edge of the left gesture-making area.

The generating module 140 generates a clockwise-rotating gesture event when the left wrist coordinate moves through a first group of gestures in a predetermined time (e.g. 1 second); wherein the first group of gestures includes: in a first order, the downward gesture, the leftward gesture and the upward gesture. In a second order, the leftward gesture, the upward gesture, and the rightward gesture; and in a third order, the upward gesture, the rightward gesture, and the downward gesture. The first group of gestures may also include, in a fourth order, the rightward gesture, the downward gesture, and the leftward gesture event.

The generating module 140 may also generate an anti-clockwise-rotating gesture event when the left wrist coordinate moves through a second group of gestures in a predetermined time. The second group of gestures includes, in a fifth order, the downward gesture, the rightward gesture, and the upward gesture; in a sixth order, the rightward gesture, the upward gesture, and the leftward gesture; in a seventh order, the upward gesture, the leftward gesture, and the downward gesture event. In an eighth order, the second group of gestures may include the leftward gesture, the downward gesture, and the rightward gesture.

When the gesture-making area is the right side of the gesture-making area, the generating module 140.

The generating module 140 generates an upward gesture event when the y-axis coordinate value of the right wrist coordinate is greater than the y-axis coordinate value of a top edge of the right gesture-making area.

The generating module 140 generates a downward gesture event when the y-axis coordinate value of the right wrist coordinate is less than the y-axis coordinate value of a bottom edge of the right gesture-making area.

The generating module 140 generates a leftward gesture event when the x-axis coordinate value of the right wrist coordinate is greater than the x-axis coordinate value of a left edge of the right gesture-making area.

The generating module 140 generates a rightward gesture event when the x-axis coordinate value of the right wrist coordinate is less than the x-axis coordinate value of a right edge of the right gesture-making area.

The generating module 140 generates a forward gesture event when the z-axis coordinate value of the right wrist coordinate is greater than the z-axis coordinate value of a front edge of the right gesture-making area.

generates a clockwise-rotating gesture event when the right wrist coordinate moves through a first group of gestures in a predetermined time (e.g. 1 second); wherein the first group of gestures includes: in a first order, the downward gesture, the leftward gesture event and the upward gesture. In a second order, the leftward gesture, the upward gesture and the rightward gesture; and in a third order, the upward gesture, the rightward gesture and downward gesture. The first group of gestures may also include, in a fourth order, the rightward gesture, the downward gesture, and the leftward gesture.

The generating module 140 may also generates an anti-clockwise-rotating gesture when the right wrist coordinate moves through a second group of gestures in a predetermined time (e.g. 1 second). The second group of gestures includes, in a fifth order, the downward gesture, the rightward gesture and the upward gesture; in a sixth order, the rightward gesture, the upward gesture and the leftward gesture; in a seventh order, the upward gesture, the leftward gesture and the downward gesture. In a eighth order, the second group of gestures may include the leftward gesture, the downward gesture, and the rightward gesture.

Figure 9:
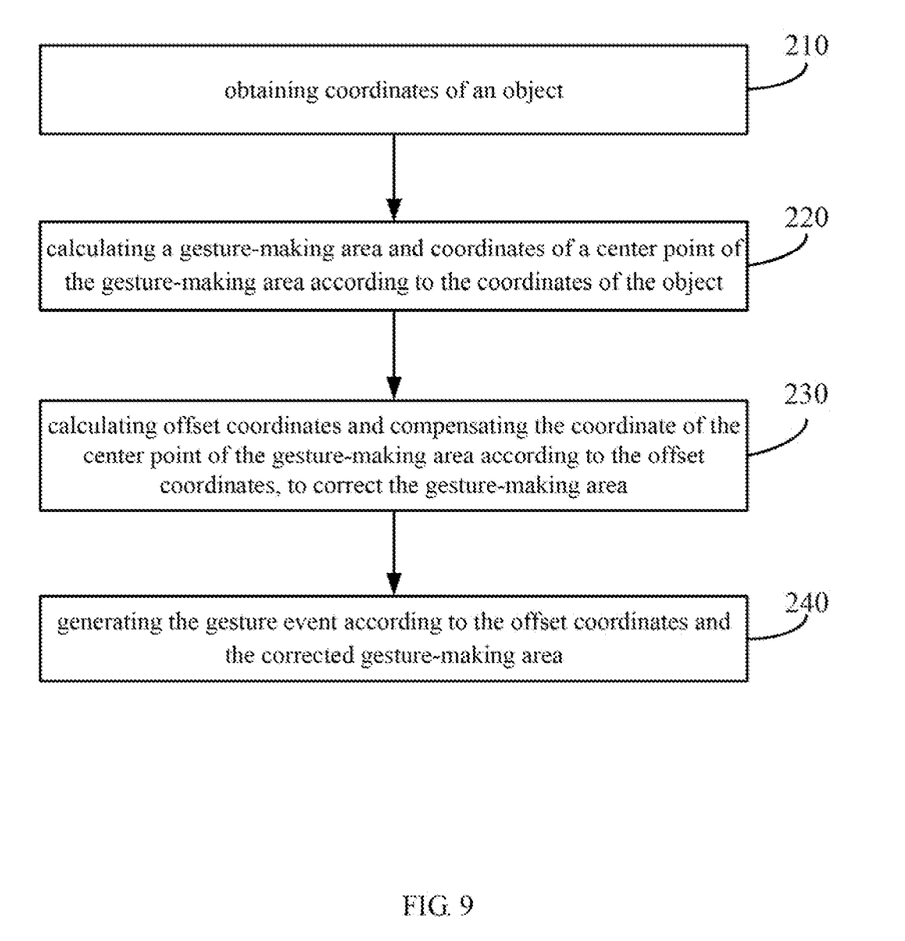
FIG. 9 is a flowchart of one embodiment of a method for generating gestures.

FIG. 9 is a flowchart of one embodiment of a method. The method is operable to be executed in a computing device (e.g. somatosensory equipment). The computing device may include an obtaining module, a calculating module, a compensating module and a generating module.

At block 210, the computing device obtains coordinates of an object. The computing device may, for example, obtain the coordinates of the object by one or more distance sensors, or by analyzing images captured by at least one camera in the computing device, to obtain the coordinates of the object.

At block 220, the computing device calculates a gesture-making area and a coordinate of a center point of the gesture-making area according to the coordinates of the object. The coordinate of the center point of the gesture-making area includes a coordinate of a center point of the left gesture-making area and a coordinate of a center point of the right gesture-making area. The gesture-making area comprises a left gesture-making area and a right gesture-making area.

The formula for calculating the coordinate of the center point of the left gesture-making area is following: $C(x, y, z)=P(x, y, z)+d(x, y, z)$, wherein the $C(x, y, z)$ is the coordinate of the center point of the left gesture-making area, the $P(x, y, z)$ is the left shoulder coordinate, the $d(x, y, z)$ is an arbitrary coordinate that is configured to $|d(x, y, z)|<D1$, and the D1 is a maximum distance between the left shoulder coordinate and the head coordinate. A distance between a left edge of the left gesture-making area and the center point of the left gesture-making area is S, $S=k*D2$, the k is a real number, and the D2 is a distance between the left elbow coordinate and the left wrist coordinate. In the illustrated embodiment, the k is a predetermined value within the range of (0.1-3).

The left side of gesture-making area, which distances the S from the coordinate of the center point of the left gesture-making area, is generated when the C(x, y, z) serves as the coordinate of the center point of the left gesture-making area.

The formula for calculating the coordinate of the center point of the right gesture-making area further includes: C1(x, y, z)=P1(x, y, z)+d1(x, y, z), wherein the C1(x, y, z) is the coordinate of the center point of the right gesture-making area, the P1(x, y, z) is the right shoulder coordinate, the d1(x, y, z) is an arbitrary coordinate that is configured to |d1(x, y, z)|<D11, and the D11 is a maximum distance between the right shoulder coordinate and the head coordinate. A distance between a left side of the right gesture-making area and the center point of the right gesture-making area is S1, S1=k1*D12, the k1 is a real number, and the D12 is a distance between the right elbow coordinate and the right wrist coordinate. In the illustrated embodiment, the k1 is a predetermined value within the range of (0.1-3). In the same way as described above, the right said of gesture-making area, which distances the S1 from the coordinate of the center point of the right gesture-making area, is generated when the C1(x, y, z) serves as the coordinate of the center point of the left gesture-making area (referring to FIG. 5). As illustrated in FIG. 5, a shape of the right gesture-making area is a rectangle. The disclosure is not limited thereto, the right gesture-making area may be, for example, an area of three-dimensional-space. The shape of the right gesture-making area may be, for example, an oval, a diamond, hexagon, and others. The distances S1, between the coordinate of the center point of the right gesture-making area and a plurality of edges (e.g. front, behind, top or bottom edge) of the gesture-making area, are all different. According to orientations of different objects, an adapted area is configured by adjusting S1 (referring to FIG. 6).

According to the formula C1(x, y, z)=P1(x, y, z)+d1(x, y, z), the right shoulder coordinate P1(x, y, z) changes when the object moves/is moved, so the C1(x, y, z) changes with the movement, and the right gesture-making area also moves accordingly, the disclosure is not limited to one position. Referring to FIG. 7, the right gesture-making area moves to right hand side when the object is moved to the right. Similarly, the left gesture-making area also moves with the object.

At block 230, the computing device calculates offset coordinates, and compensates the coordinate of the center point of the gesture-making area according to the calculated offset coordinates, to correct the gesture-making area.

The offset coordinate includes a left offset coordinate and a right offset coordinate.

The calculation of the left offset coordinate further includes: the left offset coordinate being I(x, y, z), wherein the left offset coordinate is obtained after training based on machine learning algorithms. The machine learning algorithms can be decision tree algorithms.

An example of calculating an x-axis coordinate value of the left offset coordinates is given. Referring to FIG. 8, an actual x-axis distance DL between the object and the computing device is measured by a tool (e.g. a ruler) when the object is located in a position (e.g. a left position in front of the computing device). A test x-axis distance between the center point of the left gesture-making area and the computing device is calculated by the computing device, and a difference value between the actual distance and the test value is obtained. In the same way as described above, a plurality of different values may be obtained, which correspond to a plurality of positions of the object. An average value of the plurality of difference values is calculated, the average value being the x-axis coordinate value of the left offset coordinates. Similarly, a y-axis coordinate value of the left offset coordinates and a z-axis coordinate value of the left offset coordinates also can be obtained.

The formula for compensating the coordinate of the center point of the left gesture-making area is: $C\hat{}(x, y, z)=C(x, y, z)+I(x, y, z)$, wherein the $C\hat{}(x, y, z)$ is the compensated coordinate of the center point of the right gesture-making area.

The right offset coordinate being I1(x, y, z), wherein the right offset coordinate is obtained after training based on machine learning algorithms. The machine learning algorithms can be decision tree algorithms.

An example of calculating an x-axis coordinate value of the right offset coordinates is given. Referring to FIG. 8, an actual x-axis distance DR between the object and the computing device is measured by a tool (e.g. a ruler) when the object is located in a position (e.g. a right position in front of computing device), a test x-axis distance between the center point of the right gesture-making area and the computing device is calculated by the computing device, and a difference value between the actual distance and the test value is obtained. In the same way as described above, a plurality of different values may be obtained, which correspond to a plurality of positions of the object. An average value of the plurality of difference values is calculated, the average value being the x-axis coordinate value of the right offset coordinates. A y-axis coordinate value of the right offset coordinates and a z-axis coordinate value of the right offset coordinates also can be obtained.

The formula for compensating the coordinate of the center point of the right gesture-making area is: $C1\hat{}(x, y, z)=C1(x, y, z)+I1(x, y, z)$, wherein the $C1\hat{}(x, y, z)$ is the compensated coordinate of the center point of the right gesture-making area.

At block 240, the computing device analyzes and describes a gesture according to the offset coordinates and the corrected gesture-making area, and generates a gesture event according to the analyzed and described gesture (e.g. an upward gesture, an upward gesture, a downward gesture, a leftward gesture, a rightward gesture). In the illustrated embodiment, the wrist coordinates include a left wrist coordinate and a right wrist coordinate. The left wrist coordinate is adjusted by references to an offset coordinate of the left wrist (namely, the left wrist coordinate is obtained by adding the left wrist coordinate and the offset coordinate of the left wrist), and the right wrist coordinate is adjusted by reference to an offset coordinate of the right wrist (in other words, the right wrist coordinate is obtained by adding the right wrist coordinate and the offset coordinate of the right wrist).

In block 240, where the x-axis is a horizontal axis, left side of the axis is positive side of the axis, and right is negative; where the y-axis is a vertical axis, up is positive, down is negative. Where the z-axis is a depth axis, front is positive, behind is negative. When the gesture-making area is a left side of the gesture-making area.

The computing device generates an upward gesture event when the y-axis coordinate value of the left wrist coordinate is greater than the y-axis coordinate value of a top edge of the left gesture-making area.

The computing device generates a downward gesture event when the y-axis coordinate value of the left wrist coordinate is less than the y-axis coordinate value of a bottom edge of the left gesture-making area.

The computing device generates a leftward gesture event when the x-axis coordinate value of the left wrist coordinate is greater than the x-axis coordinate value of a left edge of the left gesture-making area.

The computing device generates a rightward gesture event when the x-axis coordinate value of the left wrist coordinate is less than the x-axis coordinate value of a right edge of the left gesture-making area.

The computing device generates a forward gesture event when the z-axis coordinate value of the left wrist coordinate is greater than the z-axis coordinate value of a front edge of the left gesture-making area.

The computing device generates a clockwise-rotating gesture event when the left wrist coordinate moves through a first group of gestures in a predetermined time (e.g. 1 second); wherein the first group of gestures includes: in a first order, the downward gesture, the leftward gesture and the upward gesture. In a second order, the leftward gesture, the upward gesture, and the rightward gesture; and in a third order, the upward gesture, the rightward gesture, and the downward gesture. The first group of gestures may also include, in a fourth order, the rightward gesture, the downward gesture, and the leftward gesture event.

The computing device may also generates an anticlockwise-rotating gesture event when the left wrist coordinate moves through a second group of gestures in a predetermined time. The second group of gestures includes, in a fifth order, the downward gesture, the rightward gesture, and the upward gesture; in a sixth order, the rightward gesture, the upward gesture, and the leftward gesture; in a seventh order, the upward gesture, the leftward gesture, and the downward gesture event. In an eighth order, the second group of gestures may include the leftward gesture, the downward gesture, and the rightward gesture.

When the gesture-making area is right gesture-making area, the computing device.

The computing device generates an upward gesture event when the y-axis coordinate value of the right wrist coordinate is greater than the y-axis coordinate value of a top edge of the right gesture-making area (an upward gesture is analyzed and described according to the above description in this paragraph).

The computing device generates a downward gesture event when the y-axis coordinate value of the right wrist coordinate is less than the y-axis coordinate value of a bottom edge of the right gesture-making area (a downward gesture is analyzed and described according to the above description in this paragraph).

The computing device generates a leftward gesture event when the x-axis coordinate value of the right wrist coordinate is greater than the x-axis coordinate value of a left edge of the right gesture-making area (a leftward gesture is analyzed and described).

The computing device generates a rightward gesture event when the x-axis coordinate value of the right wrist coordinate is less than the x-axis coordinate value of a right edge of the right gesture-making area (a rightward gesture is analyzed and described).

The computing device generates a forward gesture event when the z-axis coordinate value of the right wrist coordinate is greater than the z-axis coordinate value of a front edge of the right gesture-making area.

The computing device generates a clockwise-rotating gesture event when the right wrist coordinate moves through a first group of gestures in a predetermined time (e.g. 1 second); wherein the first group of gestures includes: in a first order, the downward gesture, the leftward gesture event and the upward gesture. In a second order, the leftward gesture, the upward gesture and the rightward gesture; and in a third order, the upward gesture, the rightward gesture and downward gesture. The first group of gestures may also include, in a fourth order, the rightward gesture, the downward gesture, and the leftward gesture.

The computing device may also analyze and describe an anticlockwise-rotating gesture when the right wrist coordinate moves through a second group of gestures in a predetermined time (e.g. 1 second). The second group of gestures includes, in a fifth order, the downward gesture, the rightward gesture and the upward gesture; in a sixth order, the rightward gesture, the upward gesture and the leftward gesture; in a seventh order, the upward gesture, the leftward gesture and the downward gesture. In a eighth order, the second group of gestures may include the leftward gesture, the downward gesture, and the rightward gesture.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A computing device for generating a gesture event, comprising:
   at least one processor;
   a non-transitory storage system coupled to the at least one processor and configured to store one or more programs that are executed by the at least one processor, the one or more programs comprising instructions for:
      obtaining coordinates of an object;
      calculating a gesture-making area and coordinates of a center point of the gesture-making area according to the coordinates of the object;
      calculating offset coordinates;
      compensating, to correct the gesture-making area, the coordinate of the center point of the gesture-making area according to the offset coordinates, to correct the gesture-making area; and
      generating the gesture event according to the offset coordinates and the corrected gesture-making area;
      wherein the coordinates of the object comprises: a head coordinate, a left shoulder coordinate, a right shoulder coordinate, a left elbow coordinate, a right elbow coordinate, a left wrist coordinate, a right wrist coordinate, a left leg joint coordinate, and/or a right leg joint coordinate;
      wherein the gesture-making area comprises a right gesture-making area, the coordinate of the center point of the gesture-making area is a coordinate of a center point of the right gesture-making area, and the calculation of the coordinate of the center point of the right gesture-making area further comprises: $C1(x, y, z) = P1(x, y, z) + d1(x, y, z)$, wherein the $C1(x, y, z)$ is the coordinate of the center point of the right gesture-making area, the $P1(x, y, z)$ is the right shoulder coordinate, the $d1(x, y, z)$ is an arbitrary coordinate that is configured to $|d1(x, y, z)| < D11$, the $D11$ is a maximum distance between the right shoulder coordinate and the head coordinate, a distance between a left edge of the right gesture-making area and the center point of the right gesture-making area is S1, S1=k1*D12, the k1 is a real number, and the D12 is a distance between the right elbow coordinate and the right wrist coordinate.

2. The computing device of claim 1, wherein the offset coordinate comprises a right offset coordinate, the calculation of the right offset coordinate further comprises:
(a2) calculating x-axis, y-axis, or z-axis test distance between the center point of the left gesture-making area and the computing device;
(b2) calculating difference value between test distance and an actual distance; wherein the actual distance, measured with tool, is a x-axis, y-axis, or z-axis distance between the object and the computing device;
repeating (a2)-(b2) while the position of the object is changed, to obtain a plurality of difference values between the test distance and the actual distance, which are correspond to a plurality of positions of the object;
calculating an average value of the plurality of difference values, the average value is the x-axis, y-axis or z-axis coordinate value of the right offset coordinate.

3. The device of claim 1, wherein the generation of the gesture event comprises:
generating an upward gesture event when the y-axis coordinate value of the right wrist coordinate is greater than the y-axis coordinate value of a top edge of the right gesture-making area;
generating a downward gesture event when the y-axis coordinate value of the right wrist coordinate is less than the y-axis coordinate value of a bottom edge of the right gesture-making area;
generating a leftward gesture event when the x-axis coordinate value of the right wrist coordinate is greater than the x-axis coordinate value of a left edge of the right gesture-making area;
generating a rightward gesture event when the x-axis coordinate value of the right wrist coordinate is less than the x-axis coordinate value of a right edge of the right gesture-making area;
generating a forward gesture event when the z-axis coordinate value of the right wrist coordinate is greater than the z-axis coordinate value of a front edge of the right gesture-making area;
generating a clockwise-rotation gesture event when the right wrist coordinate satisfies to generate a first group of gestures in a predetermined time, wherein the first group of gestures comprises:
in a first order, a downward gesture, a leftward gesture and an upward gesture;
in a second order, a leftward gesture, an upward gesture and a rightward gesture;
in a third order, an upward gesture, a rightward gesture and a downward gesture; or
in a fourth order, a rightward gesture, a downward gesture and a leftward gesture; and
generating an anticlockwise-rotation gesture event when the right wrist coordinate satisfies to generate a second group of gesture events in a predetermined time, wherein the second group of gesture events comprises:
in a fifth order, a downward gesture, a rightward gesture and an upward gesture;
in a sixth order, a rightward gesture, an upward gesture and a leftward gesture;
in a seventh order, an upward gesture, a leftward gesture and a downward gesture; or
in a eighth order, a leftward gesture, a downward gesture and a rightward gesture.

4. The computing device of claim 1, wherein the gesture-making area comprises a left gesture-making area, the coordinate of the center point of the gesture-making area is a coordinate of a center point of the left gesture-making area, and the calculation of the coordinate of the center point of the left gesture-making area further comprises: C(x, y, z)=P(x, y, z)+d(x, y, z), wherein the C(x, y, z) is the coordinate of the center point of the left gesture-making area, the P(x, y, z) is the left shoulder coordinate, the d(x, y, z) is an arbitrary coordinate that is configured to |d(x, y, z)|<D1, the D1 is a maximum distance between the left shoulder coordinate and the head coordinate, a distance between a left edge of the left gesture-making area and the center point of the left gesture-making area is S, S=k*D2, the k is a real number, and the D2 is a distance between the left elbow coordinate and the left wrist coordinate.

5. The computing device of claim 4, wherein the offset coordinate comprises a left offset coordinate, the calculation of the left offset coordinate further comprises:
(a1) calculating x-axis, y-axis, or z-axis test distance between the center point of the left gesture-making area and the computing device;
(b1) calculating difference value between the test distance and an actual distance; wherein the actual distance, measured with tool, is a x-axis, y-axis, or z-axis distance between the object and the computing device;
repeating (a1)-(b1) while the position of the object is changed, to obtain a plurality of difference values between the test distance and the actual distance, which are correspond to a plurality of positions of the object; and
calculating an average value of the plurality of difference values, the average value is the x-axis, y-axis or z-axis coordinate value of the left offset coordinate.

6. The computing device of claim 4, wherein the generation of the gesture event comprises:
generating an upward gesture event when the y-axis coordinate value of the left wrist coordinate is greater than the y-axis coordinate value of a top edge of the left gesture-making area;
generating a downward gesture event when the y-axis coordinate value of the left wrist coordinate is less than the y-axis coordinate value of a bottom edge of the left gesture-making area;
generating a leftward gesture event when the x-axis coordinate value of the left wrist coordinate is greater than the x-axis coordinate value of a left edge of the left gesture-making area;
generating a rightward gesture event when the x-axis coordinate value of the left wrist coordinate is less than the x-axis coordinate value of a right edge of the left gesture-making area;
generating a forward gesture event when the z-axis coordinate value of the left wrist coordinate is greater than the z-axis coordinate value of a front edge of the left gesture-making area;
generating a clockwise-rotation gesture event when the left wrist coordinate moves through a first group gestures in a predetermined time, wherein the first group of gestures comprises:
in a first order, a downward gesture, a leftward gesture and an upward gesture;
in a second order, a leftward gesture, an upward gesture and a rightward gesture;
in a third order, an upward gesture, a rightward gesture and a downward gesture; or in a fourth order, a rightward gesture, a downward gesture and a leftward gesture; and generating an anticlockwise-rotation gesture event when the left wrist coordinate moves through a second group of gestures in a predetermined time, wherein the second group of gestures comprises:
in a fifth order, a downward gesture, a rightward gesture and an upward gesture;
in a sixth order, a rightward gesture, an upward gesture and a leftward gesture;
in a seventh order, an upward gesture, a leftward gesture and a downward gesture; or
in an eighth order, a leftward gesture, a downward gesture and a rightward gesture.

7. A method for generating a gesture event operable to be executed in a computing device, wherein the method comprising:
obtaining coordinates of an object;
calculating a gesture-making area and a coordinate of a center point of the gesture-making area according to the coordinates of the object;
calculating offset coordinates;
compensating, to correct the gesture-making area, the coordinate of the center point of the gesture-making area according to the offset coordinates;
generating the gesture event according to the offset coordinates and the corrected gesture-making area;
wherein the coordinates of the object comprises: a head coordinate, a left shoulder coordinate, a right shoulder coordinate, a left elbow coordinate, a right elbow coordinate, a left wrist coordinate, a right wrist coordinate, a left leg joint coordinate, and/or a right leg joint coordinate;
wherein the gesture-making area comprises a right gesture-making area, the coordinate of the center point of the gesture-making area is a coordinate of a center point of the right gesture-making area, and calculation of the coordinate of the center point of the right gesture-making area further comprising: $C1(x, y, z)=P1(x, y, z)+d1(x, y, z)$, wherein the $C1(x, y, z)$ is the coordinate of the center point of the right gesture-making area, the $P1(x, y, z)$ is the right shoulder coordinate, the $d1(x, y, z)$ is an arbitrary coordinate that is configured to $|d1(x, y, z)|<D11$, the D11 is a maximum distance between the right shoulder coordinate and the head coordinate, a distance between a left edge of the right gesture-making area and the center point of the right gesture-making area is S1, $S1=k*D12$, the K is a real number, and the D12 is a distance between the right elbow coordinate and the right wrist coordinate.

8. The method of claim 7, wherein the offset coordinate comprises a right offset coordinate, the calculation of the right offset coordinate further comprises:
(a2) calculating x-axis, y-axis, or z-axis test distance between the center point of the left gesture-making area and the computing device;
(b2) calculating difference value between test distance and an actual distance; wherein the actual distance, measured with tool, is a x-axis, y-axis, or z-axis distance between the object and the computing device;
repeating (a2)-(b2) while the position of the object is changed, to obtain a plurality of difference values between the test distance and the actual distance, which are correspond to a plurality of positions of the object;
calculating an average value of the plurality of difference values, the average value is the x-axis, y-axis or z-axis coordinate value of the right offset coordinate.

9. The method of claim 7, wherein the generation of the gesture event comprises:
generating an upward gesture event when the y-axis coordinate value of the right wrist coordinate is greater than the y-axis coordinate value of a top edge of the right gesture-making area;
generating a downward gesture event when the y-axis coordinate value of the right wrist coordinate is less than the y-axis coordinate value of a bottom edge of the right gesture-making area;
generating a leftward gesture event when the x-axis coordinate value of the right wrist coordinate is greater than the x-axis coordinate value of a left edge of the right gesture-making area;
generating a rightward gesture event when the x-axis coordinate value of the right wrist coordinate is less than the x-axis coordinate value of a right edge of the right gesture-making area;
generating a forward gesture event when the z-axis coordinate value of the right wrist coordinate is greater than the z-axis coordinate value of a front edge of the right gesture-making area;
generating a clockwise-rotation gesture event when the right wrist moves through a first group of gestures in a predetermined time, wherein the first group of gestures comprises:
in a first order, a downward gesture, a leftward gesture and an upward gesture;
in a second order, a leftward gesture, an upward gesture and a rightward gesture;
in a third order, an upward gesture, a rightward gesture and a downward gesture; or
in a fourth order, a rightward gesture, a downward gesture and a leftward gesture; and
generating an anticlockwise-rotation gesture event when the right wrist coordinate satisfies to generate a second group of gesture events in a predetermined time, wherein the second group of gesture events comprises:
in a fifth order, a downward gesture, a rightward gesture and an upward gesture;
in a sixth order, a rightward gesture, an upward gesture and a leftward gesture;
in a seventh order, an upward gesture, a leftward gesture and a downward gesture; or
in a eighth order, a leftward gesture, a downward gesture and a rightward gesture.

10. The method of claim 7, wherein the gesture-making area comprises a left gesture-making area, the coordinate of the center point of the gesture-making area is a coordinate of a center point of the left gesture-making area, and calculation of the coordinate of the center point of the left gesture-making area further comprises: $C(x, y, z)=P(x, y, z)+d(x, y, z)$, wherein the $C(x, y, z)$ is the coordinate of the center point of the left gesture-making area, the $P(x, y, z)$ is the left shoulder coordinate, the $d(x, y, z)$ is an arbitrary coordinate that is configured to $|d(x, y, z)|<D1$, the D1 is a maximum distance between the left shoulder coordinate and the head coordinate, a distance between a left edge of the left gesture-making area and the center point of the left gesture-making area is S, $S=k*D2$, the k is a real number, and the D2 is a distance between the left elbow coordinate and the left wrist coordinate.

11. The method of claim 10, wherein the offset coordinate comprises a left offset coordinate, the calculation of the left offset coordinate further comprises:

(a1) calculating x-axis, y-axis, or z-axis test distance between the center point of the left gesture-making area and the computing device;

(b1) calculating difference value between the test distance and an actual distance; wherein the actual distance, measured with tool, is a x-axis, y-axis, or z-axis distance between the object and the computing device;

repeating (a1)-(b1) while the position of the object is changed, to obtain a plurality of difference values between the test distance and the actual distance, which are correspond to a plurality of positions of the object;

calculating an average value of the plurality of difference values, the average value is the x-axis, y-axis or z-axis coordinate value of the left offset coordinate.

12. The method of claim 10, wherein the generation of the gesture event further comprises:

generating an upward gesture event when the y-axis coordinate value of the left wrist coordinate is greater than the y-axis coordinate value of a top edge of the left gesture-making area;

generating a downward gesture event when the y-axis coordinate value of the left wrist coordinate is less than the y-axis coordinate value of a bottom edge of the left gesture-making area;

generating a leftward gesture event when the x-axis coordinate value of the left wrist coordinate is greater than the x-axis coordinate value of a left edge of the left gesture-making area;

generating a rightward gesture event when the x-axis coordinate value of the left wrist coordinate is less than the x-axis coordinate value of a right edge of the left gesture-making area;

generating a forward gesture event when the z-axis coordinate value of the left wrist coordinate is greater than the z-axis coordinate value of a front edge of the left gesture-making area;

generating a clockwise-rotation gesture event when the left wrist coordinate moves through a first group gestures in a predetermined time, wherein the first group of gestures comprises:

in a first order, a downward gesture, a leftward gesture and an upward gesture;

in a second order, a leftward gesture, an upward gesture and a rightward gesture;

in a third order, an upward gesture, a rightward gesture and a downward gesture; or in a fourth order, a rightward gesture, a downward gesture and a leftward gesture; and generating an anticlockwise-rotation gesture event when the left wrist coordinate moves through a second group of gestures in a predetermined time, wherein the second group of gestures comprises:

in a fifth order, a downward gesture, a rightward gesture and an upward gesture;

in a sixth order, a rightward gesture, an upward gesture and a leftward gesture;

in a seventh order, an upward gesture, a leftward gesture and a downward gesture; or in an eighth order, a leftward gesture, a downward gesture and a rightward gesture.

\* \* \* \* \*